US008196195B2

(12) United States Patent
Bartley et al.

(10) Patent No.: US 8,196,195 B2
(45) Date of Patent: Jun. 5, 2012

(54) ROLE-BASED PRIVILEGE MANAGEMENT (75) Inventors: Timothy Simon Bartley, Worongary (AU); Peter T. Cogill, Southport (AU); Elizabeth M. Hughes, Southport (AU); Philip A. J. Nye, Labrador (AU); Michael Andrew Powell, Clear Island Waters (AU)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/171,941

(22) Filed: Jul. 11, 2008

(65) Prior Publication Data
US 2010/0011438 A1 Jan. 14, 2010

(51) Int. Cl.
*G06F 17/00* (2006.01)
(52) U.S. Cl. ............................. 726/17; 726/21
(58) Field of Classification Search .................. 726/17, 726/21, 26–30; 713/2; 380/30
See application file for complete search history.

(56) References Cited

U.S. PATENT DOCUMENTS

| 5,911,143 | A | * | 6/1999 | Deinhart et al. ................ 1/1 |
| 6,023,765 | A | * | 2/2000 | Kuhn ............................. 726/4 |
| 7,284,271 | B2 | * | 10/2007 | Lucovsky et al. ............. 726/21 |
| 7,343,628 | B2 | * | 3/2008 | Buchholz et al. ............ 726/28 |
| 2002/0186838 | A1 | * | 12/2002 | Brandys ....................... 380/30 |
| 2006/0047657 | A1 | | 3/2006 | Frieder et al. |
| 2006/0107032 | A1 | * | 5/2006 | Paaske et al. ................... 713/2 |
| 2006/0136717 | A1 | * | 6/2006 | Buer et al. ................. 713/155 |
| 2006/0229979 | A1 | * | 10/2006 | Sato et al. ..................... 705/39 |
| 2007/0233709 | A1 | * | 10/2007 | Abnous et al. .............. 707/100 |
| 2008/0016580 | A1 | * | 1/2008 | Dixit et al. .................... 726/27 |
| 2008/0098233 | A1 | * | 4/2008 | Dewkett et al. ............ 713/189 |

OTHER PUBLICATIONS

Zhang et al., "ARBAC07: A Role-based Administration Model for RBAC with Hybrid Hierarchy", IEEE International Conference on Information Reuse and Integration, 2007. IRI 2007, Aug. 13-15, 2007 pp. 196-202.
Squair et al., "An RBAC-based policy Information Base" Proceedings of the sizth IEEE International Workshop on Policies for Distributed Systems and Networks (Policy'05), Jun. 2005, pp. 1-10.

* cited by examiner

*Primary Examiner* — Christopher J Brown
*Assistant Examiner* — Fahimeh Mohammadi
(74) *Attorney, Agent, or Firm* — Yee & Associates, P.C.; John D. Flynn (57) ABSTRACT

A computer implemented method, data processing system, and computer program product for role-based privilege management is provided. A transformation request is received from a requester to form a received request, and a target environment of the received request is identified. A determination is made whether the target environment matches a predefined environment in a set of role-based privileges and, responsive to a determination that the target environment matches a predefined environment in the set of role-based privileges, the parameterized privileges from the set of role-based privileges are mapped to the target environment and the request is performed.

15 Claims, 6 Drawing Sheets

700 role: ⟋702
    role-name
    ( role*
      | privilege-template-reference*)

role-name:
    string privilege-template-reference:
    privilege-template-name
    privilege-template-instantiation* privilege-template-name:
    string privilege-template-instantiation:
    applies-to-specification
    parameter-defintion*
    privilege-template-instantiation* applies-to-specification:
    applies-to-keyword
    environment-names+ applies-to-keyword: ⟍704
    "Applies-To"
    Set of environments to which the privilege template or privilege
    template instantiation applies.

parameter-definition:
    parameterised-parameter-name
    parameterised-parameter-value parameterised-parameter-name:
    Parameterised reference to parameter-name - that is references to
    parameter names may themselves be parameterised. Resolution of
    the parameter name is performed recursively. It is an error to
    have circular dependencies on parameter names.

parameterised-parameter-value:
    parameterised-string parameter-name:
    Arbitrary name of parameter as referenced in one or more privilege
    templates or parameter-definitions privilege-template:
    privilege-template-name
    privilege-template*
    privilege-template-definition*

FIG. 8

ROLE-BASED PRIVILEGE MANAGEMENT

BACKGROUND OF THE INVENTION

1. Field of the Invention

The present invention relates generally to an improved data processing system and, more specifically, to a computer implemented method, an apparatus, and a computer program product for role-based privilege management.

2. Description of the Related Art

Various systems used today represent authorization policy using role-based access control (RBAC) semantics. While a role may span many domains, for example, membership of the application admin role may confer administrative privileges for the operating system, a database, and an application server, there is no general way to represent the privileges conveyed by a role membership in a single way. Role-based privileges may vary from system to system, causing privileges to be relative to an install location of particular files on a system, particular universal resource locator (URL), Web resources, or operating system type.

The representation of the role-based access control policies has become complex and varied. Having to deal with various implementations of similar, yet different, role scenarios across multiple systems, subsystems, and applications typically leads to administration inefficiencies, confusion, and possible errors.

BRIEF SUMMARY OF THE INVENTION

According to one embodiment of the present invention, a computer implemented method for role-based privilege management is provided. The computer implemented method receives a transformation request from a requester to form a received request and identifies a target environment of the received request. The computer implemented method determines whether the target environment matches a predefined environment in a set of role-based privileges and, responsive to a determination that the target environment matches a predefined environment in the set of role-based privileges, maps the parameterized privileges from the set of role-based privileges to the target environment and performs the request.

In another illustrative embodiment, an apparatus in the form of a data processing system for role-based privilege management is provided. The data processing system comprises a bus, a memory connected to the bus, wherein the memory comprising computer-executable instructions, a communications unit connected to the bus, a display unit connected to the bus, a processor unit connected to the bus, wherein the processor unit executes the computer-executable instructions in the memory to direct the data processing system to receive a transformation request from a requester to form a received request, identify a target environment of the received request, determine whether the target environment matches a predefined environment in a set of role-based privileges, respond to a determination that the target environment matches a predefined environment in the set of role-based privileges, to map parameterized privileges from the set of role-based privileges to the target environment, and perform the request.

In yet another illustrative embodiment, a computer program product for role-based privilege management is provided. The computer program product comprises computer-readable, recordable-type medium tangibly embodying computer-executable instructions. The computer-executable instructions comprising, computer-executable instructions for receiving a transformation request from a requester to form a received request, computer-executable instructions for identifying a target environment of the received request, computer-executable instructions for determining whether the target environment matches a predefined environment in a set of role-based privileges, computer-executable instructions responsive to a determination that the target environment matches a predefined environment in the set of role-based privileges, for mapping parameterized privileges from the set of role-based privileges to the target environment, and computer-executable instructions for performing the request.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

Figure 1:
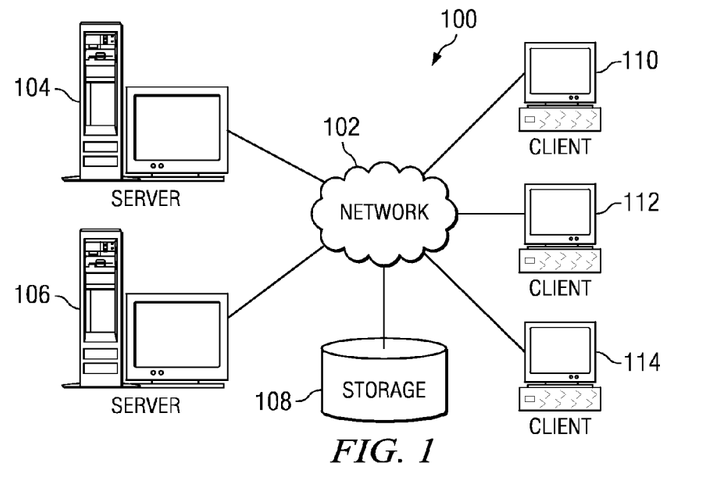
FIG. 1 is a pictorial representation of a network of data processing systems in which illustrative embodiments may be implemented.
Figure 2:
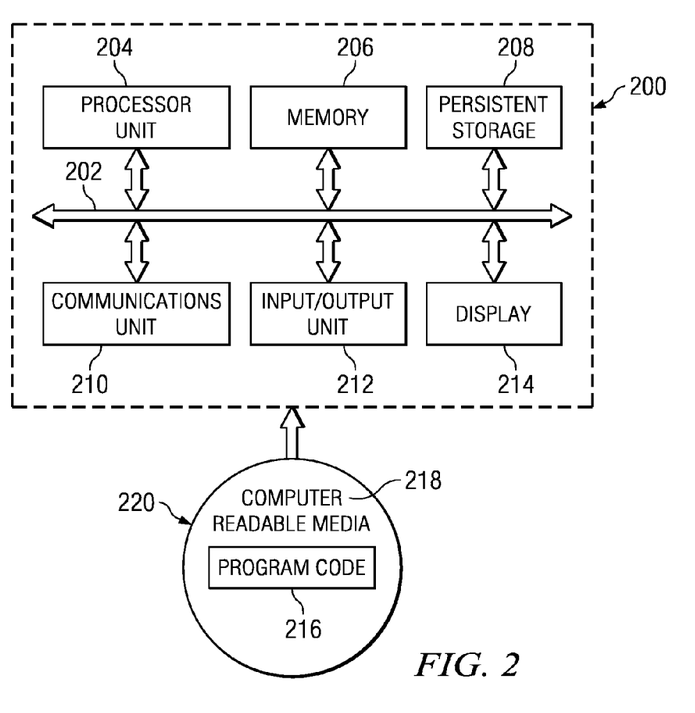
FIG. 2 is a block diagram of a data processing system is shown in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

A set of privilege templates and roles may be defined, stored, and managed on servers 104 and 106 for use by users on clients 110-114 through network 102 of data processing system 100. The set of privilege templates are referenced by roles to convey a predefined set of privileges to a holder of the role in a predefined environment. The predefined environment is a target environment. For example, a set of privileges may be defined to allow a user having a specified role to perform the task of starting and stopping a server, such as server 104 and server 106. Further, each server may represent different target environments that are not compatible in the sense of using the same commands. The single source of definitions is transformed into target environment specific formats to be processed as needed by a respective platform. The independent format of the definitions allows for flexibility and portability while providing low-level operational support for a target environment.

With reference now to FIG. 2, a block diagram of a data processing system is shown in which illustrative embodiments may be implemented. Data processing system 200 is an example of a computer, such as server 104 or client 110 in FIG. 1, in which computer-usable program code, or instructions implementing the processes, may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
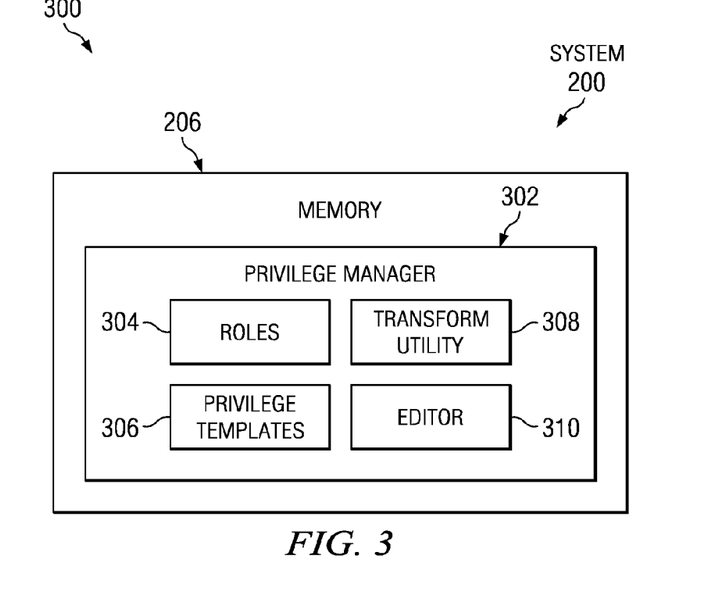
FIG. 3 is a block diagram of components of a privilege manager in accordance with illustrative embodiments.

With reference to FIG. 3, a block diagram of components of a privilege manager in accordance with illustrative embodiments is shown. A portion of system 200 of FIG. 2 is shown with a number of components within privilege manager 302, all within memory 206 of system 200 of FIG. 2.

Privilege manager 302 is comprised of components including roles 304, privilege templates 306, transform utility 308 and editor 310. Privilege manager 302 provides a convenient package of services for managing authorization policies using the definitions of roles 304 and privilege templates 306. Transform utility 308 manages the transition from the platform independent form of definitions in roles 304 and privilege templates 306 into platform specific forms suitable for use on the target platforms. Editor 310 provides a capability to create and modify the source definitions of roles 304 and privilege templates 306. The source form of the definitions may be stored text or non-text, proprietary or non-proprietary form including storage in a database management system, extensible markup language (XML), or extensible access control markup language (XACML) form of maintaining the policy representation.

The source definitions provided in roles 304 and privilege templates 306 provide a very low-level, granular capability to define, and thus manage, the specification and conveyance of privileges to users or components.

Figure 4:
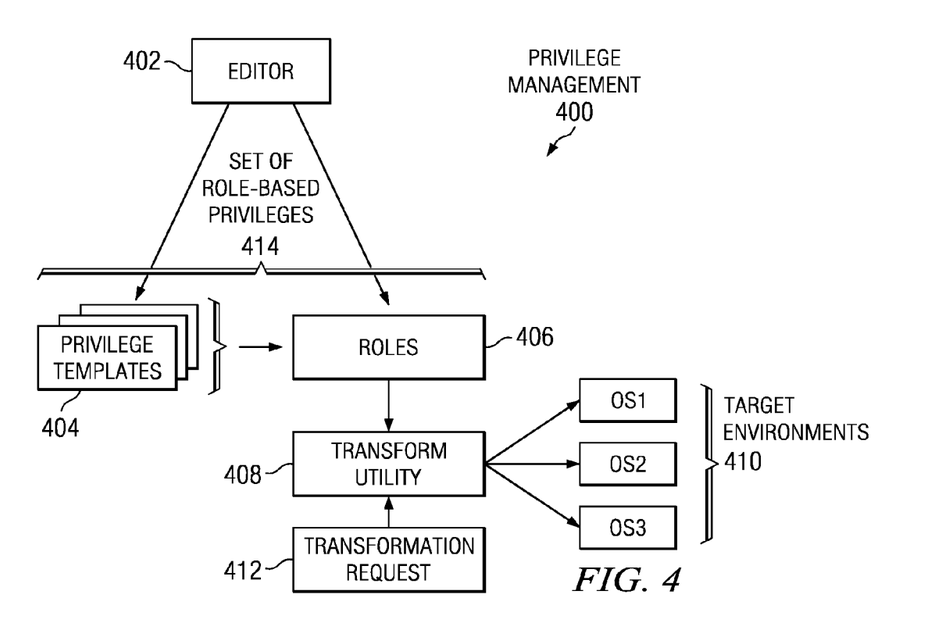
FIG. 4 is a block diagram of a privilege management system in accordance with illustrative embodiments.

With reference to FIG. 4, a block diagram of a role-based privilege management system is shown, in accordance with illustrative embodiments. Role-based privilege management system 400 comprises a number of components including an editor 402, privilege templates 404, roles 406, transform utility 408, target environments 410, transformation request 412, and a set of role-based privileges 414. In various embodiments, privilege templates 404, roles 406, and target environments 410 may each refer to a set of elements within. For example, roles 406 comprises a set or roles containing one or more members of the set, the members being specific to the set or roles being discussed. In another example, privilege templates 404 contains a set of one or more privilege templates. A combination of privilege templates 404 and roles 406 define a set of role-based privileges 414 within role-based privilege management system 400.

Editor 402 is a typical general editor, suitable for editing the stored form of the rule and template definitions. For example, a text-based editor may be used for text editing of markup language-based documents or files. Editor 402 is used to create and maintain the definitions for privilege templates 404 and roles 406.

Privilege templates 404 defines the privileges to be conveyed to a user having a defined role referencing the privilege templates. One or more privilege templates may be referred to by roles 406. Roles 406 may also inherit privileges from other specifically referenced roles, as defined in the hierarchical definition of the role. Roles 406 provides the conveyance vehicle for privileges, as defined in associated privilege templates 404.

Transform utility 408 provides a capability of taking the platform-independent definitions of roles 406 and privilege templates 404 onto target environments 410. The independent format of definitions is made environment-specific by transform utility 408. Transform utility 408 may also select the appropriate definitions based on indicators in privilege templates 404 and roles 406. Target environments 410 has been shown as operating system platforms of OS1, OS2 and OS3, but the environments may be applications, or subsystems as well, and is not meant to be limited to an operating system environment. Transform utility 408 is responsive to transformation request 412 to initiate a transform of the definitions, in the applicable instances of privilege templates 404 and roles 406, toward the desired target environment, as defined by target environments 410.

Set of role-based privileges 414 defines one or more privileges conveyed to a specific role. For example, a role of administrator may have specifically conveyed privileges of create, update and delete access to a command file or use of the commands.

Figure 5:
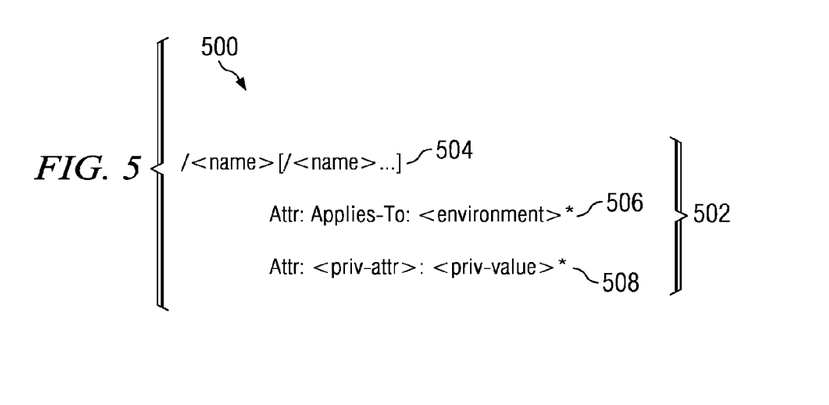
FIG. 5 is a text representation of a general format of a privilege template, in accordance with illustrative embodiments.

With reference to FIG. 5, a text representation of a general format of a privilege template, in accordance with illustrative embodiments is shown. The example uses a conventional tag-based language format to define the various elements of privilege template 500. Illustrative embodiments depict the two basic data model concepts of privilege templates and roles.

Privilege templates are defined in a generalized form using parameterized privilege information. Roles are then defined as references to a set of previously defined privilege templates with values specified for the parameterized elements of the privilege templates.

Attributes define the privileges granted to roles that reference the specified privilege template. There are two forms of attributes. One form of attribute defines the environment to which the template applies. Another form of attribute defines the privileges that are conveyed. Privilege templates are defined hierarchically with child templates inheriting the properties of parent templates.

Privilege template 500 is a hierarchical structure. The hierarchy allows minimal duplication of information. For example, in the definition of privilege template 500, fragment 502 represents a basic structure needed to compose privilege template 500. Fragment 502 shows a set of statements for specifying a name of a template and basic attributes. Statement 504 provides a name for the privilege template being defined. The name may then be used to refer to the privilege template by other privilege templates or roles.

Statement 506 and statement 508 provide attribute definitions. These statements may be repeated as needed to fill out the privilege being defined. For example, statement 506 defines the environment to which the following attribute definitions apply. The keyword applies-to indicates an environment specification is being made and the following value is a name of the environment. Environment is typically an operating system type specification, but may also be a platform comprising an application or database subsystem.

Statement 508 defines a privilege attribute and an associated attribute value. The statement indicates the privileges being conveyed in this instance. Attributes are categories of identified elements in the target environment or categories that may be mapped to such elements. For example, an attribute can be a command, while the value can be the command itself.

Figure 6:
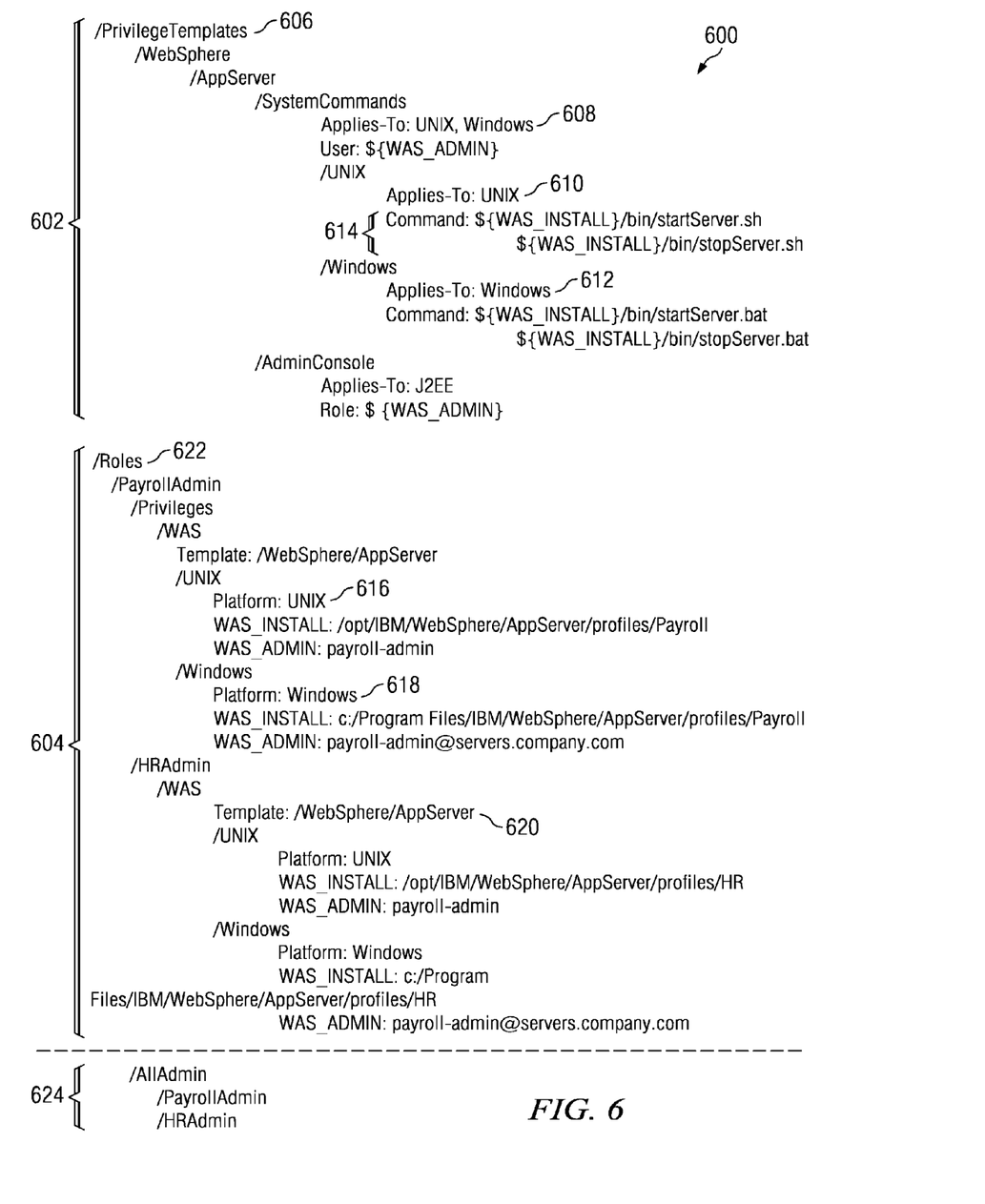
FIG. 6 is a text representation of an example of a privilege template with a role definition, and an inherited role example, in accordance with illustrative embodiments.

With reference to FIG. 6, a text representation of an example of a privilege template with a role definition, and an inherited role example, in accordance with illustrative embodiments is shown. Template 600 depicts a privilege template, a role definition, and a hierarchical role specification. For example, fragment 602 is an example of a privilege template, fragment 604 is an example of a role definition, and fragment 624 is an example of a hierarchical role definition.

The privilege templates typically contain references to platform specific privileges for each of the platform based roles referencing the specified privilege templates. The roles and privileges are not defined in a platform independent form rather the definitions provide a transform capability to a desired platform. A specific set of platform privileges as specified in the privileges template may be selected by the transform utility and transformed. The privilege template provides a capability to define privileges specific to one, all or more than one platform, as required.

User assignment to specific roles is not managed using the privilege templates or the role template definitions. Assignment of a user to a role may be managed in a file separate from the file containing the privilege templates and role definitions or the same file. The privilege templates and role definition examples provided in the context of privilege manager 302 of FIG. 3 provide the definitions to identify roles and the associated privileges for an environment in which a previously defined user of a specified role typically exists.

The privilege template of fragment 602 begins with an identification of PrivilegeTemplates 606 followed by the names, WebSphere, and AppServer, indicating an inheritance from prior templates. Statement 608 is the first attribute type statement in the privilege template. Statement 608 indicates the environment to which the privileges associated with SystemCommands will be conveyed. In this example, two environments are defined.

Statement 610 is another attribute definition statement and is related to the previous statement specifying the environments. In statement 610, the environments of statement 608 have been narrowed in scope to only a single, specific instance. This example shows how a specification can be made more specific, or granular, when needed. Statement 612 is a corresponding attribute statement providing the definitions for the other environment named in statement 608. Statements 610 and 612, therefore, complete the further specification of the respective environments.

Statement 614 provides a parameterized definition for an attribute of a command type. The statement defines the commands allowed, by conveyance of the privilege, to start and stop a server in the specific named environment. For example, the value "${WAS_INSTALL}" indicates that the particular command is dependent on the parameter "WAS_INSTALL"

defined by the particular role or target environment. The parameter is resolved by a reference to the privilege template by the specific roles, in this case a different value is provided for "WAS$_{13}$ INSTALL" for each of the PayrollAdmin and HRAdmin roles, as well as the particular target platforms.

Having defined the privilege template, role definitions for two different applications that make use of the same application may then be defined. Users can be assigned roles in any number of ways, either by direct mapping of users to roles or potentially indirectly via group membership. The storage location of this mapping is immaterial to the function.

In the example of defining two roles in fragment 604, statement 622 indicates that a role specification follows. As in the naming of the privilege template, a series of names follows the specification keyword of role. The hierarchy of names first specifies the role for /PayrollAdmin/Privileges/WAS. Statement 616 indicates the attribute of platform has a specified value applicable to the named platform of UNIX™, wherein UNIX is a registered trademark of The Open Group. In similar fashion, statement 618 provides the attribute of platform with an assigned value of Windows®, wherein Windows is a registered trademark of Microsoft Corporation in the United States, and other countries.

Statement 620 indicates use of a previously defined template named /WebSphere/AppServer. This template was previously defined in fragment 602 as a privilege template. However, this template is now being incorporated by reference into the definition for the role /HRAdmin/WAS and not /PayrollAdmin/Privileges/WAS, as defined in the first portion of fragment 604.

From the example, users assigned to the PayrollAdmin role are conferred the privileges granted by the /WebSphere/AppServer privilege template, with UNIX and Windows environment parameters instantiated as shown. In this case, the definitions provide a user with the permission to run the startServer and stopServer commands with operating system identity payroll-admin on UNIX, or payroll-admin@servers.company.com on Windows. Definition of the HRAdmin role now requires only reference to the existing privilege template and added or changed definition of parameter values specific to the HRAdmin role.

A simple consequence of this representation is that roles may be defined hierarchically as well. For example, AllAdmin role 624 could be simply defined as having inherited all definitions below PayrollAdmin and HRAdmin, identical to the prior example and omitted here for brevity.

Prior solutions may also use hierarchies of roles as a way of simplifying administration and inheriting privilege, but at a very coarse level. The hierarchies of parameterized privileges just described represent low-level details of how privileges are actually implemented by resource providers, including operating systems, application servers, and other subsystems.

The common thread among prior solutions defined hierarchies of roles which reference privileges. The current described approach defines an intermediate object of the parameterized privilege template between the defined roles and defined privileges, which minimizes the amount of information needed to be managed across heterogeneous environments, and even within homogeneous environments. While the definition of a set of privileges is typical of a particular product or environment, that product or environment is instantiated multiple times, with each instantiation being administered separately.

Figure 7A:
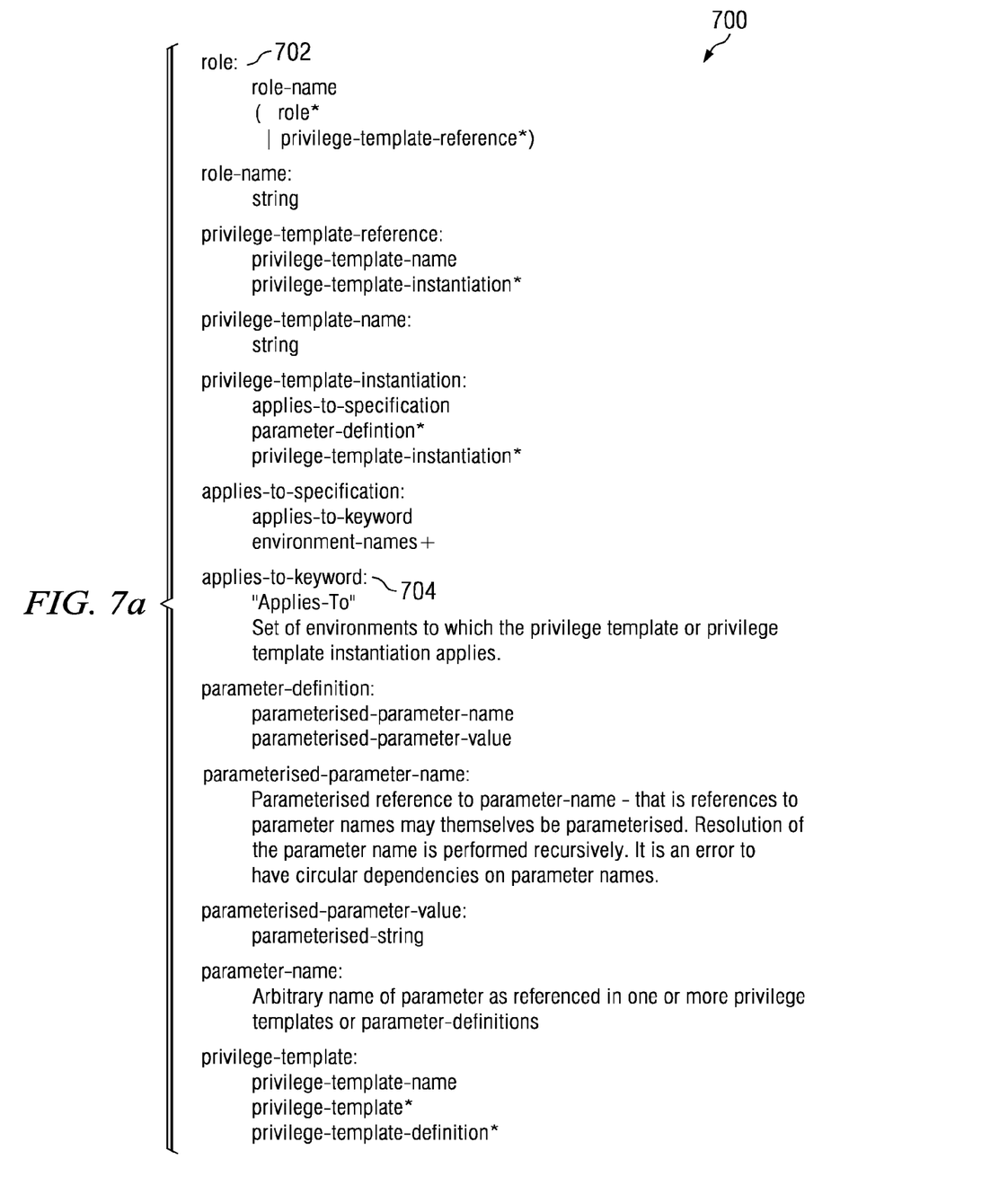
FIGS. 7A-7B are a text representation of a generalized role specification, in accordance with illustrative embodiments.
Figure 7B:
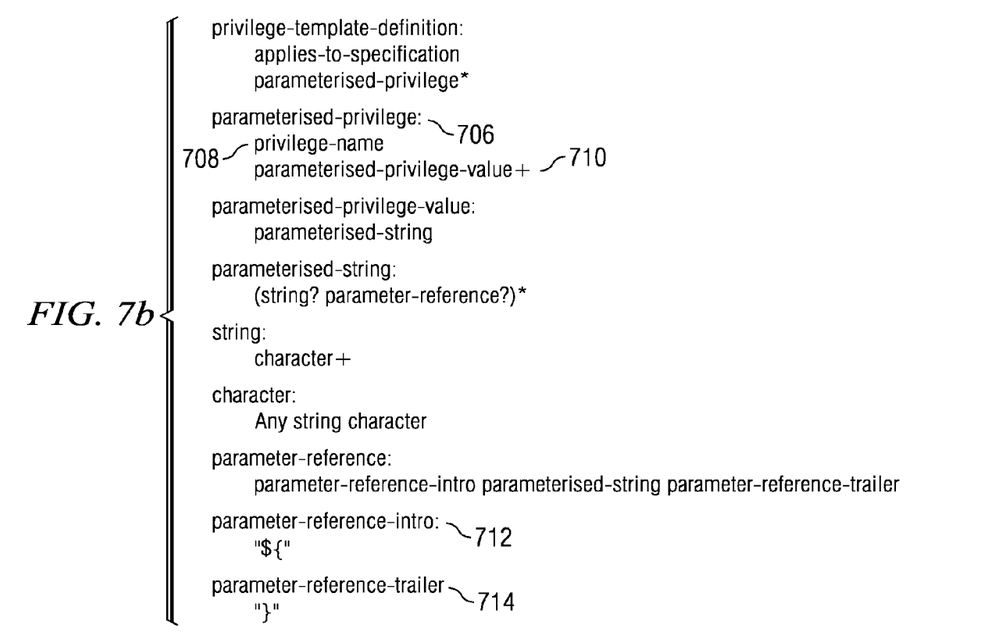

With reference to FIGS. 7A-7B, text representations of a generalized role specification, in accordance with illustrative embodiments are shown. Data structure 700 comprises a set of statements defining elements of a role. Data structure 700 has been designed to capture and use inheritance hierarchies to minimize the redundant representation of role and privilege information. The statements are presented as combinations of a keyword or identifier portion and an attribute with value portion. The set of definitions provide a data model for the specification of policies in an environment independent format.

Statement 702 has a keyword of role identifying the statement as a statement that begins a set or collection of related statements that defines a role. In the example statement, the role may have an assigned name or refer to another template from which to inherit definitions.

Statement 704 defines the environment to which the role being defined is applicable of the "applies-to-keyword". For example, named environments may typically be based on an operating system platform or a sub-system definition, such as a database representation or application. The statement provides a scope or boundary for defined privileges.

Statement 706 provides a format for the provision of a privilege name and associated value. For example, privilege-parameter-name 708 identifies the attribute of interest, while privilege-parameter-value 710 provides the value assigned to the associated parameter. The combination provides a capability to define elements and associate values with the defined elements at a fairly granular level, if needed.

Statement 708 provides a capability to define an environment specific reference name for use within the role definitions. For example, when a widget is the appropriate term in one environment while object is the corresponding term in another environment, the correct term may be used in the specific environment. The input is used by a transformation utility to provide the necessary term to avoid an error.

Use of parameter-reference-intro 712 and parameter-reference-trailer 714 provide definitions of start and stop character sequences used in the definitions. The notation used with the definitions of FIG. 7 is as follows: "A: B C" means "A" consists of elements "B" and "C, A: B|C" means "A" consists either element "B" or element "C, A: B*" means "A" consists of zero or more "B" elements, "A: B+" means "A" consists of one or more "B" elements, "A: B?" means "A" consists of zero or one "B," "A: (B)" means "A" consists of "B", and "A: "string"" means "A" is the string literal "string." The use of the parentheses indicates the content within takes precedence over everything else. Use of the "or" symbol "|" has the lowest precedence of all constructs.

In the schema definitions just described, parameter values are resolved recursively. For example, using the following privilege template sample reference:

```
/WAS
    Applies-To: All
    Command: ${WAS_INSTALL}/bin/startServer.sh
``` with a role definition fragment of:

```
/HR-WAS
    WAS_INSTALL:  ${WAS_ROOT}/profile/HR
    UNIX/
        WAS_ROOT: /opt/IBM/WebSphere/AppServer
    Windows/
        WAS_ROOT: C:\IBM\WebSphere\AppServer
```

WAS_INSTALL is defined in terms of WAS_ROOT which is further defined at a lower level of hierarchy. The transform utility may also pre-define certain parameters and associated parameter values based on information the transform utility has regarding the target platform, such as an operating system specific version. Characters used to identify the start and stop of parameter reference strings may also be defined for a specific implementation. For example, illustrative embodiments in this example use the "${" characters to introduce the parameter reference strings but these may be altered as needed.

Figure 8:
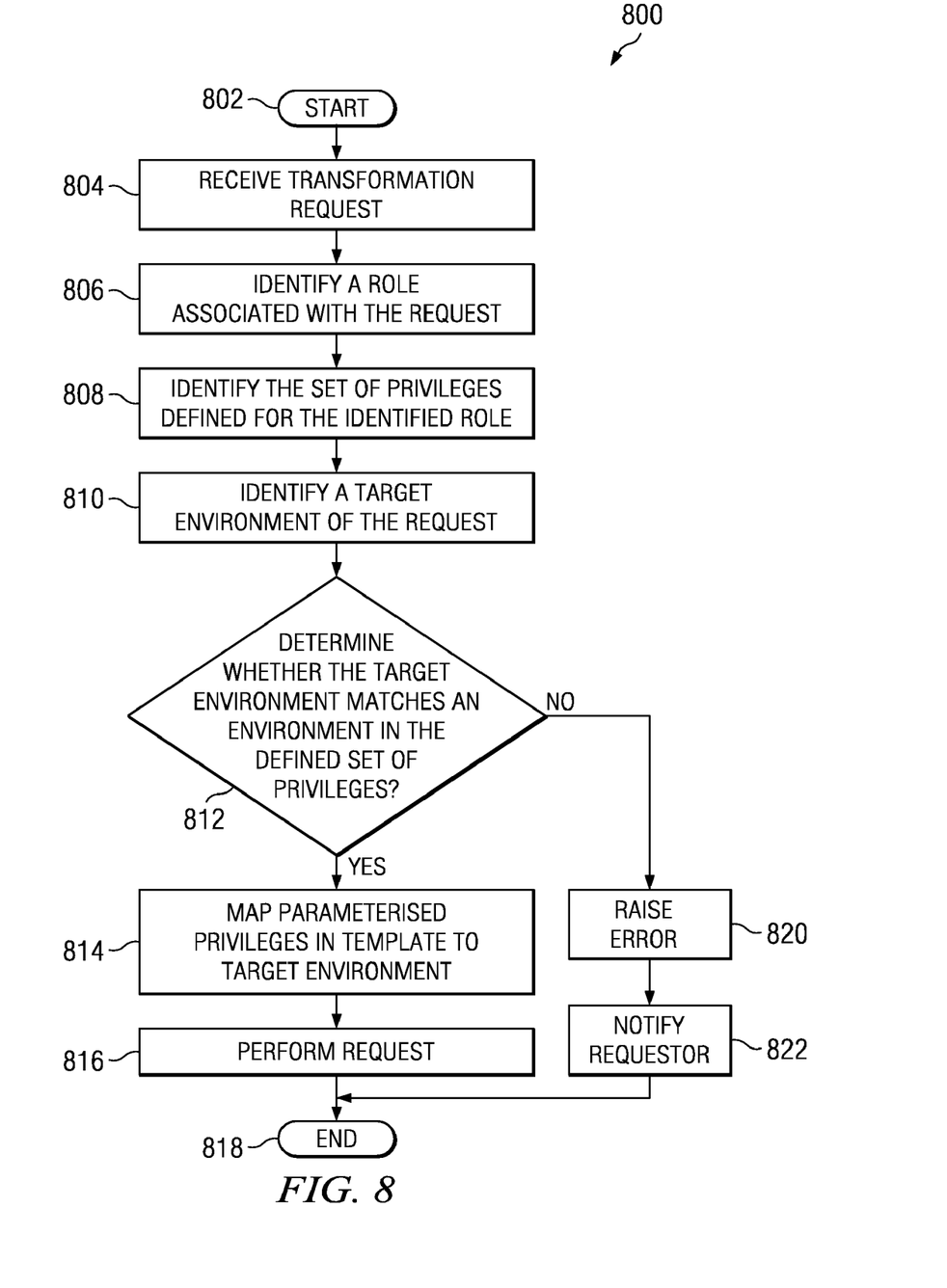
FIG. 8 is a flowchart of a process using the privilege manager of FIG. 3, in accordance with illustrative embodiments.

With reference to FIG. 8, a flowchart of a process using the privilege manager of FIG. 3, in accordance with illustrative embodiments is shown. Process 800 is an example of a process using privilege manager 302 of FIG. 3.

Process 800 starts (step 802) and receives transformation request (step 804). The transformation request includes a role of the requester that initiates the transformation. Processing of the transformation request by privilege manager 302 of FIG. 3 only transforms the role-based access control information and is not to be considered a full authorization process. Identification of a role associated with the request (step 806) provides the needed role information. From the role information, a determination is made of the set of privileges defined for the identified role (step 808). The set of privileges defined for the role provides the privileges to be conveyed to the role holder.

The process overview comprises determining for each role applicable to a particular target environment; identify each privilege template referenced by the role. For each identified privilege resolve the parameter references based on the target environment, such as operating system type, system name or subsystem identification, by mapping the defined privilege into the corresponding equivalent definition on the target system. When there is no system equivalent definition, generate an error and end. When the source and target system definitions are equivalent, define the target system role-based on the resolved privileges and end.

An environment in which the conveyed privileges are to operate is established by identification of a target environment of the request (step 810). The environment establishes the operational scope of the privileges. A determination is made as to whether the identified target environment matches the specified environment in the defined set of privileges (step 812). When the target environment matches the defined environment, a "yes" is obtained in step 812. When a target environment does not match the defined environment, a "no" is obtained in step 812. When a "no" is obtained in step 812, an error, raised (step 820). The error is typically the result of an inability to perform an equivalence mapping between source and target representations. Notification of the error is made to the requester (step 822), and process 800 terminates thereafter (step 818). The mismatch of the definitions or incomplete definitions is cause for the operation to stop because a valid transform to the target environment cannot be performed as requested.

When a "yes" is obtained in step 812, a mapping of the parameterized privileges in the privilege templates is made to the target environment (step 814). The mapping transforms the platform or environment independent definitions in the privilege templates and the roles to platform or environment specific forms as needed. The request is then performed in the target environment (step 816), with process 800 terminating thereafter (step 818).

Using the capabilities described in the illustrative embodiments allows for the platform or environment independent definitions of privileges and roles to be more efficiently used. The hierarchical structure of the privilege templates and role definitions allow for the fine-grained specifications to be made while reducing the occurrence of redundant information. The implementation of the privilege templates provides an intermediate form of data between the specification of the role and the privileges to be conveyed. The intermediate form may then be combined to produce a combination of definitions as needed. The privilege templates also provide a low-level or granular definition for easier and more specific implementation of privileges.

The flowchart and block diagrams in the figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose, hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly, or indirectly, to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for role-based privilege management, the computer implemented method comprising:
    receiving a request from a requester for an allocation of privileges associated with a role in a target environment;
    identifying the target environment of the request and the role requested;
    identifying, using a processing unit, a set of privilege templates referenced by the role, wherein the set of privilege templates includes parameters for a plurality of environments;
    determining whether the target environment is one of the plurality of environments referenced by the parameters in the set of privilege templates;
    responsive to determining that the target environment is one of the plurality of environments referenced by the parameters in the set of privilege templates, mapping values from the parameters that are specific to the target environment to the target environment; and
    conveying to the requester the privileges associated with the role in the target environment;
    wherein identifying the set of privilege templates referenced by the role comprises:
        identifying a plurality of privileges associated with the role; and
        searching a database for a privilege template for an individual privilege in the plurality of privileges, wherein the privilege template includes a first set of parameters for assigning the individual privilege in a first system having a first operating system and a second set of parameters for assigning the individual privilege in a second system having a second operating system.

2. The computer implemented method of claim 1 further comprising:
    responsive to determining that the target environment is one of the plurality of environments referenced by the parameters in the set of privilege templates, raising an error; and
    notifying the requester.

3. The computer implemented method of claim 1, wherein identifying the target environment of the request comprises:
    identifying an operating system of a computer system that the request was received from as the target environment; and
    wherein mapping values from the parameters that are specific to the target environment to the target environment comprises:
        selecting a set of parameters from the set of privilege templates that are specific to the operating system of the computer system.

4. The computer implemented method of claim 1, wherein identifying the set of privilege templates referenced by the role comprises:
    searching a database for a set of role-based privileges for the role, wherein the set of role-based privileges include one or more privileges for the role; and
    identifying a privilege template for each privilege in the set of role-based privileges to form the set of privilege templates referenced by the role, wherein the set of role-based privileges comprises a data structure having a hierarchical structure having a set of attributes of a first type to define a specific environment to which the set of role-based privileges apply, and a set of attributes of a second type to define privileges to be conveyed in the specific environment.

5. The computer implemented method of claim 1, wherein providing the requester with the allocation of privileges associated with the role in the target environment comprises:
    providing the requester with the allocation of privileges only upon mapping values from the parameters that are specific to the target environment.

6. A data processing system for role-based privilege management, the data processing system comprising:
    a bus;
    a memory connected to the bus, wherein the memory comprising program code;
    a communications unit connected to the bus;
    a display unit connected to the bus;
    a processor unit connected to the bus, wherein the processor unit is configured to execute the program code:
    receive a request from a requester for an allocation of privileges associated with a role in a target environment;
    identify the target environment of the request and the role requested;
    identify a set of privilege templates referenced by the role, wherein the set of privilege templates includes parameters for a plurality of environments;
    determine whether the target environment is one of the plurality of environments referenced by the parameters in the set of privilege templates;

map, responsive to determining that the target environment is one of the plurality of environments referenced by the parameters in the set of privilege templates-values from the parameters that are specific to the target environment to the target environment; and convey to the requester the privileges associated with the role in the target environment;

wherein in executing the program code to identify the set of privilege templates referenced by the role the processor unit is further configured to execute the program code:

identify a plurality of privileges associated with the role; and search a database for a privilege template for an individual privilege in the plurality of privileges, wherein the privilege template includes a first set of parameters for assigning the individual privilege in a first system having a first operating system and a second set of parameters for assigning the individual privilege in a second system having a second operating system.

7. The data processing system of claim 6, wherein the processor unit is further configured to execute the program code to:

raise, responsive to determining that the target environment is one of the plurality of environments referenced by the parameters in the set of privilege templates, an error; and notify the requester.

8. The data processing system of claim 6, wherein in executing the program code to identify the target environment of the request, the processor unit is further configured to execute the program code to:

identify an operating system of a computer system that the request was received from as the target environment; and wherein in executing the program code to map values from the parameters that are specific to the target environment to the target environment the processor unit is further configured to execute the program code to:

select a set of parameters from the set of privilege templates that are specific to the operating system of the computer system.

9. The data processing system of claim 6, wherein in executing the program code to identify the set of privilege templates referenced by the role, the processor unit is further configured to execute the program code to:

search a database for a set of role-based privileges for the role, wherein the set of role-based privileges include one or more privileges for the role; and identify a privilege template for each privilege in the set of role-based privileges to form the set of privilege templates referenced by the role, wherein the set of role-based privileges comprises a data structure having a hierarchical structure having a set of attributes of a first type to define a specific environment to which the set of role-based privileges apply, and a set of attributes of a second type to define privileges to be conveyed in the specific environment.

10. The data processing system of claim 6, wherein in executing the program code to provide the requester with the allocation of privileges associated with the role in the target environment, the processor unit is further configured to execute the program code provide the requester with the allocation of privileges only upon mapping values from the parameters-that are specific to the target environment.

11. A computer program product for role-based privilege management, the computer program product comprising:

a set of computer readable storage devices; program code, stored on at least one of the set of computer readable storage devices, for receiving a request from a requester for an allocation of privileges associated with a role in a target environment;

program code, stored on at least one of the set of computer readable storage devices, for identifying the target environment of the request and the role requested;

program code, stored on at least one of the set of computer readable storage devices, for identifying a set of privilege templates referenced by the role, wherein the set of privilege templates includes parameters for a plurality of environments;

program code, stored on at least one of the set of computer readable storage devices, for determining whether the target environment is one of the plurality of environments referenced by the parameters in the set of privilege templates;

program code, stored on at least one of the set of computer readable storage devices, responsive to determining that the target environment is one of the plurality of environments referenced by the parameters in the set of privilege templates, for mapping values from the parameters that are specific to the target environment to the target environment; and program code, stored on at least one of the set of computer readable storage devices, for conveying to the requester the privileges associated with the role in the target environment;

wherein the program code for identifying the set of privilege templates referenced by the role comprises:

program code, stored on at least one of the set of computer readable storage devices, for identifying a plurality of privileges associated with the role; and program code, stored on at least one of the set of computer readable storage devices, searching a database for a privilege template for an individual privilege in the plurality of privileges, wherein the privilege template includes a first set of parameters for assigning the individual privilege in a first system having a first operating system and a second set of parameters for assigning the individual privilege in a second system having a second operating system.

12. The computer program product of claim 11 further comprising:

program code, stored on at least one of the set of computer readable storage devices, responsive to determining that the target environment is one of the plurality of environments referenced by the parameters in the set of privilege templates, for raising an error; and program code, stored on at least one of the set of computer readable storage devices, for notifying the requester.

13. The computer program product of claim 11, wherein the program code for identifying the target environment of the request comprises:

program code, stored on at least one of the set of computer readable storage devices, for identifying an operating system of a computer system that the request was received from as the target environment; and wherein the program code for mapping values from the parameters that are specific to the target environment to the target environment comprises:

program code, stored on at least one of the set of computer readable storage devices, for selecting a set of parameters from the set of privilege templates that are specific to the operating system of the computer system.

14. The computer program product of claim 11, wherein the program code for identifying the set of privilege templates referenced by the role comprises:
- program code, stored on at least one of the set of computer readable storage devices, for searching a database for a set of role-based privileges for the role, wherein the set of role-based privileges include one or more privileges for the role; and
- program code, stored on at least one of the set of computer readable storage devices, for identifying a privilege template for each privilege in the set of role-based privileges to form the set of privilege templates referenced by the role, wherein the set of role-based privileges comprises a data structure having a hierarchical structure having a set of attributes of a first type to define a specific environment to which the set of role-based privileges apply, and a set of attributes of a second type to define privileges to be conveyed in the specific environment.

15. The computer program product of claim 11, wherein the program code for providing the requester with the allocation of privileges associated with the role in the target environment comprises:
- program code, stored on at least one of the set of computer readable storage devices, for providing the requester with the allocation of privileges only upon mapping values from the parameters that are specific to the target environment.

* * * * *